(12) United States Patent
Gajocha et al.

(10) Patent No.: US 11,749,913 B1
(45) Date of Patent: Sep. 5, 2023

(54) CLAMPING DEVICE WITH CLAMPING COMPENSATION

(71) Applicant: FAMECA, Rixheim (FR)

(72) Inventors: Jessica Gajocha, Ottmarsheim (FR); Christian Constans, Waltenheim (FR)

(73) Assignee: FAMECA, Rixheim (FR)

( * ) Notice: Subject to any disclaimer, the term of this patent is extended or adjusted under 35 U.S.C. 154(b) by 0 days.

(21) Appl. No.: 18/174,959

(22) Filed: Feb. 27, 2023

(51) Int. Cl.
*H01R 4/38* (2006.01)
*H01R 4/48* (2006.01)

(52) U.S. Cl.
CPC ............ *H01R 4/38* (2013.01); *H01R 4/489* (2013.01)

(58) Field of Classification Search
CPC ................................. H01R 4/38; H01R 4/489
See application file for complete search history.

(56) References Cited

U.S. PATENT DOCUMENTS

| | | | |
|---|---|---|---|
| 3,666,311 A | 5/1972 | McMullin | |
| 3,788,691 A | 1/1974 | McMullin | |
| 4,348,561 A * | 9/1982 | McKelvy | H01R 11/14 200/468 |
| 6,078,008 A * | 6/2000 | Wood | H01H 31/00 174/45 R |
| 10,790,646 B1 | 9/2020 | Flojo et al. | |
| 11,139,595 B1 * | 10/2021 | Zhang | H01R 11/11 |
| 2004/0149474 A1 | 8/2004 | Brittain et al. | |
| 2015/0270674 A1 | 9/2015 | Sook et al. | |
| 2019/0097400 A1 | 3/2019 | Ahmad et al. | |
| 2019/0190171 A1 | 6/2019 | Rahman et al. | |
| 2019/0363462 A1 | 11/2019 | O'Connell et al. | |

FOREIGN PATENT DOCUMENTS

| | | |
|---|---|---|
| EP | 2347471 B1 | 3/2016 |
| WO | 2010043801 A1 | 4/2010 |

OTHER PUBLICATIONS

Hastings, "Grounding and Jumper Equipment", Hastings Brochure, Hastings, MI, Jul. 2018 (in English, total 1 page).

* cited by examiner

*Primary Examiner* — Travis S Chambers
(74) *Attorney, Agent, or Firm* — Seckel IP, PLLC

(57) ABSTRACT

A clamping device includes: a first jaw mounted on a first support member, a second jaw mounted on a second support member, movable relative to the first support member to bring the first and second jaws toward each other in a clamping position, an actuation member adapted to move the second support member relative to the first support, and a compression member such as a spring between the actuation member and second support member. Advantageously, the first jaw is hook-shaped and the second jaw is ring-shaped. Advantageously, at least the second jaw, the compression member, and a handle of the actuation member have substantially rotational symmetry around a main axis.

30 Claims, 4 Drawing Sheets

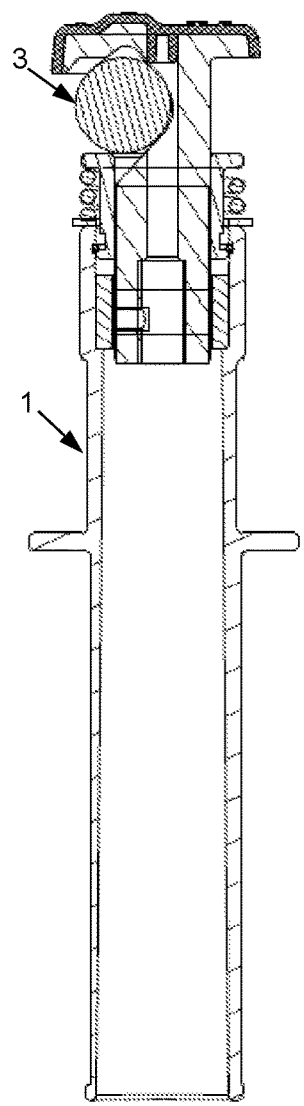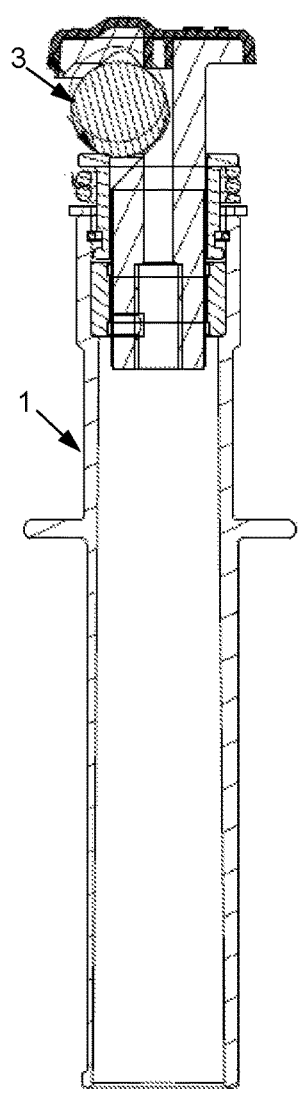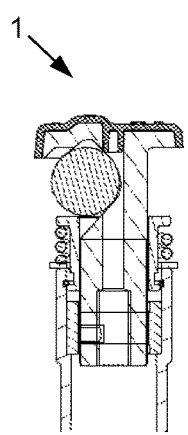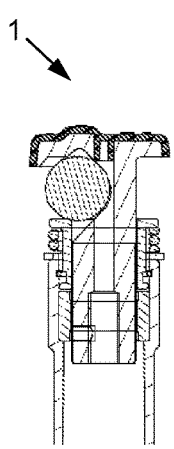
FIG. 6  FIG. 7  FIG. 8  FIG. 9
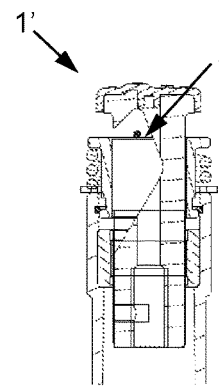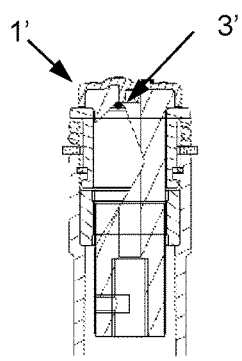
FIG. 10  FIG. 11

CLAMPING DEVICE WITH CLAMPING COMPENSATION

DESCRIPTION

The invention relates to a clamping device with clamping compensation, in particular for use as a jumper clamp on electrical conductors, such as power cables, especially medium or high voltage cables.

BACKGROUND ART

Jumper clamps used on power cables need to provide a secure hold on the cable in order to avoid loosening of the grip of the clamp jaws on the cable, which can trigger electric arcs, fire hazards, or even disconnection, creating danger for the user and others in the vicinity. Depending on usage, various embodiments of a jumper clamp are provided, which are arranged on an elongated support such as an elongated pole or rod and are also called grounding clamp, clamp stick, shotgun stick, hot stick, for example. Clamping devices are also used in other configurations, such as two jumper clamps connected by an electrical conductor, the two clamping devices intended to be clamped at spaced-apart locations on a conductor to create a bypass of the section of conductor located between the two clamping devices. Clamping devices are also used in other configurations and other fields.

Various solutions have been proposed to control and/or secure the grip of a clamping device. For example, various locking mechanisms are known, which are intended to avoid loosening or accidental opening of the clamp jaws.

SUMMARY OF THE INVENTION

Existing solutions to control and/or secure the clamping of a clamping device are insufficiently satisfactory in practice, at least in some instances. For example, a jumper clamp should provide a secure and lasting clamping effect when clamped on a section of an electrical conductor, such as a cable, that has geometrical irregularities of shape or surface, or whose shape may vary with time, as in the case of a flexible conductor.

Thus, in one aspect of the present invention, a compression compensation of the clamping effect is provided, in order to improve control and/or increase the regularity over time of the clamping force exerted on an object, such as a power cable placed in the clamp and subjected to the clamping pressure of the clamp jaws.

In another aspect of the invention, at least one of the jaws of the clamp cooperates with a compression member, or even a plurality or all of the jaws of the clamp, so as to compensate or dampen the clamping force exerted on an object, such as a power cable, placed in the clamp in a closed position of the clamp, as compared to an otherwise identical clamp whose jaws are not equipped with a corresponding compression compensation or damping member, or with corresponding compression compensation or damping members.

In another aspect of the invention, the clamp has a first jaw fixedly mounted on a support and a second jaw movably mounted on the support and adapted to move between a position closer to the first jaw and a position farther from the first jaw. At least one compression member, advantageously a damping member, more advantageously a resilient member, further advantageously a spring, such as a compression spring, is placed between a surface of the second jaw and a surface of the support, and adapted to exert a compression compensation, advantageously damping, more advantageously resilient, further advantageously elastic force, on the second jaw toward the first jaw when the jaws exert a clamping force on an object, such as a power cable, placed between the jaws. Alternatively, such a compression member is provided on the first jaw. Alternatively, at least one such a compression member is provided on more than one jaw, or even on both or all jaws of a clamping device. For example, a clamping device can have two, three or more jaws, with one, more than one, or even all jaws being provided with one or more compression members, thus creating a clamping pressure on an object held by the clamping device.

In another aspect of the invention, the clamping device has a general symmetry of revolution around a main axis of a support member, such as a support rod. A first jaw is fixedly mounted on the support and a second jaw surrounds the support and is mobile relative to the support in a translation direction along the main axis. An actuation member cooperates with the second jaw and/or with a support of the second jaw, to bring the second jaw closer to the first jaw or farther from the first jaw. For example, the actuation member is or include a nut surrounding a support of the first jaw and cooperating with the support, such as with a support rod by threading, so that the relative movement between the nut and the rod includes a rotational component by rotating the nut and a translational component along the main axis by cooperation between threads on an internal surface of the nut and an external surface of the rod.

In another aspect of the invention, the actuation member includes a handle, which can be integral with a nut cooperating with a support of a first jaw, the nut being adapted to actuate a second jaw toward or away from the first jaw. The handle advantageously has a general symmetry of revolution around the main axis. The handle can serve to actuate one of the jaw, and the handle can also be adapted to manipulate the clamping device. A compression member, advantageously a damping element, more advantageously a resilient element, further advantageously a spring or several springs, such as a compression spring or compression springs, is or are arranged between a bearing surface of the second jaw, or of a support of the second jaw, and a facing bearing surface of the actuation member. The compression member, damping element, resilient element, spring or springs, respectively, preferably has or have a generally cylindrical shape surrounding the rod. For example, a single cylindrical compression spring can be provided, or a plurality of compression springs distributed around the main axis.

Advantageously, one of the jaws, for example, a first jaw, has a general shape of a hook and/or another jaw, for example, a second jaw facing the first jaw, has a general shape of a ring, or of portions of a ring distributed around a main axis of the first jaw or of a support of the first jaw. Advantageously, the first jaw and the second jaw have respective clamping surfaces facing each other and oriented generally transversely to a main axis of the clamping device. Advantageously, the first jaw is located at an extremity of the clamping device, and the second jaw surrounds the first jaw or a support of the first jaw, and is mobile between a first position closer to the first jaw and a second position farther from the first jaw.

In another aspect, the clamping surfaces of the first and second jaw face each other at least partially in a direction of the main clamping pressure. In another aspect, the clamping surfaces of the first and second jaws include, or even consists essentially only of surfaces that do not face each other in a direction of the main clamping pressure. For example, in use, the surface of the second jaw adapted for clamping, seen in a direction of the main axis, has an annular shape, or of one or several portions of an annular shape, and the surface of the first jaw adapted for clamping, seen in a direction of the main axis, covers at least partially or even substantially totally a circular free space within the annular shape within which the clamping surface of the second jaw is located. For example, in use, the surface of the first jaw adapted for clamping includes at least a top surface transverse to the main axis and a lateral surface in a plane parallel to the main axis, such as a tangential surface, each surface optionally with a recess or groove intended to improve clamping of an object, such as a transverse groove adapted to stabilize a cable, as shown in the Figures. The lateral clamping surface can be a side surface of a neck of the hook facing the main axis, and the top surface can be a surface transverse to the main axis, located on a top portion of the hook transverse to the neck of the hook, and facing the other jaw in a direction of the main axis.

In another aspect, the actuation member comprises a handle partially or totally surrounding the main axis of the clamping device. Advantageously, the handle is in an insulating material, for example, a plastic material, which can be partially or totally opaque and/or colored and/or transparent or translucent, over a portion or the totality of its surface. Advantageously, the handle includes a cylindrical portion having a main axis oriented along the main axis of the rod, and an annular flange portion on a side of the cylindrical portion closer to the jaws, the annular flange portion having preferably a main plane oriented substantially transversely or even substantially perpendicular to the main axis of the rod. Advantageously, the cylindrical portion can serve as a handle for the clamping device. Advantageously, the flange portion, or the cylindrical portion alone or in combination with the flange portion, can serve to actuate the clamp by moving the second jaw toward or away from the first jaw, and/or by increasing or lowering the compression of the compression member when the jaws are in an active clamping position on an object, such as a power cable, for example. The handle can move the second jaw toward the first jaw, for example, by translation along the main axis, or a combination of translation and rotation movement(s) and/or other movement(s), successively or simultaneously, such as a helical movement through cooperation by threading with a support of the first jaw, for example.

Of course, the present invention covers combinations of the various aspects above, in any combinations of two, three, or more of the above features. In particular, the present invention covers combinations of operative and geometric features of the various aspects above.

In another aspect, a clamping device is provided, comprising:
- a first jaw mounted on a first support member,
- a second jaw mounted on a second support member, the second support member being movable relative to the first support member to bring the first and second jaws toward each other in a clamping position,
- an actuation member adapted to move the second support member relative to the first support, and
- a compression member between the actuation member and the second support member, the compression member being adapted to compensate a clamping force between the first jaw and the second jaw in a clamping position of the clamping device.

One or several variant embodiments can have one or more of the following features.

The first jaw can comprise a hook-shaped portion and the first support member comprises a rod-shaped portion.

The hook-shaped portion of the first jaw can be integral with the rod portion.

The second jaw can comprise a ring-shaped portion and the second support member comprises a support ring portion and/or a support sleeve portion.

The support ring portion and/or the support sleeve portion can be integral with the ring portion of the second jaw.

The first jaw can comprise a hook-shaped portion and the first support member comprises a rod-shaped portion, and the second jaw comprises a ring-shaped portion and the second support member comprises a support ring-shaped portion and/or a support sleeve portion, the ring-shaped portion of the second jaw and the support ring-shaped portion and/or the support sleeve portion of the second support member surround the rod-shaped portion of the first support member in at least one position of the first and second jaws.

The actuation member can comprise a nut.

The nut can surround the rod and cooperates with the rod-shaped portion by threading.

The actuation member can comprise a handle, the nut and the handle being linked in rotation.

The compression member can be comprised within a cylindrical shape.

The compression member can be a resilient member.

The resilient member can comprise a spring.

Each of the second support member, the actuation member, and the compression member can at least partially surround a rod-shaped portion of the first support member in at least one position of the first and second jaws.

The rod-shaped portion of the first support member and the actuation member can cooperate by threading, so that a rotation of the actuation member in one rotational direction brings the second jaw closer to the first jaw and a rotation of the actuation member in an opposite rotational direction brings the second jaw farther from the first jaw.

The first jaw can comprise a hook-shaped portion and the first support member comprises a rod-shaped portion, the second jaw can comprise a ring-shaped portion and the second support member comprises a support ring-shaped portion and/or a support sleeve portion, the ring-shaped portion of the second jaw and the support ring-shaped portion and/or the support sleeve portion can surround at least partially the rod-shaped portion of the first support member in at least one position of the first and second jaws, and be mobile in a translation direction along a main axis of the rod-shaped portion of the first support member to bring the ring-shaped portion of the second jaw closer to or farther from the hook-shaped portion of the first jaw, and the compression member can comprise a compression spring surrounding the rod-shaped portion of the first support member.

The rod-shaped portion of the first support member and the actuation member can cooperate by threading, so that a rotation of the actuation member in one rotational direction brings the ring-shaped portion of the second jaw closer to the hook-shaped portion of the first jaw and a rotation of the actuation member in an opposite rotational direction brings the ring-shaped portion of the second jaw farther from the hook-shaped portion of the first jaw.

The rod-shaped portion of the first support member can have an external thread and the actuation member can comprise a nut having an internal thread cooperating with the external thread of the rod-shaped portion of the first support member, and the actuation member can comprise a handle, the nut and the handle being linked in rotation.

The handle can surround the rod-shaped portion of the first support member in at least one position of the first and second jaws, the nut being integral with the handle.

The second support member can comprise a first annular bearing surface and the actuation member can comprise a second annular bearing surface facing the first bearing surface along a direction of a main axis of the clamping device, and the compression spring can be placed between the first and second annular bearing surfaces.

The handle can comprise a substantially cylindrical portion oriented along the main axis of the clamping device and a radial annular flange oriented transversely to the main axis of the clamping device.

BRIEF DESCRIPTION OF THE DRAWINGS

Exemplary embodiments of the invention will now be described, for illustration and in a non-limitative manner, in reference to the drawings, in which:

FIGS. 6 and 7 are cross-sectional views showing more particularly the operation of the clamping device, including before (FIG. 6) and during (FIG. 7) compression of the compression member to improve the clamping effect on the cable.

FIGS. 8 and 9 are partial cross-sectional views of the clamping device, showing the jaws holding a large diameter cable without compression of the compression member (FIG. 8) and with compression of the compression member (FIG. 9).

FIGS. 10 and 11 are partial cross-sectional views of a variant of the clamping device of FIGS. 8 and 9, in a position before clamping a small diameter cable (FIG. 10) and in a position clamping a small diameter cable (FIG. 11).

DETAILED DESCRIPTION OF PARTICULAR EMBODIMENTS

The clamping device can be arranged on an elongated support such as a long pole or rod to form a grounding clamp, clamp stick, shotgun stick, hot stick, for example. Alternatively, or additionally, the clamping device can be connected to a flexible element such as a flexible conductor, or a bypass device can be provided with a pair of clamps arranged at opposite ends of a flexible electrical conductor, for example, to provide a bypass for a section of a main cable, or a bypass between two different cables.

Figure 1:
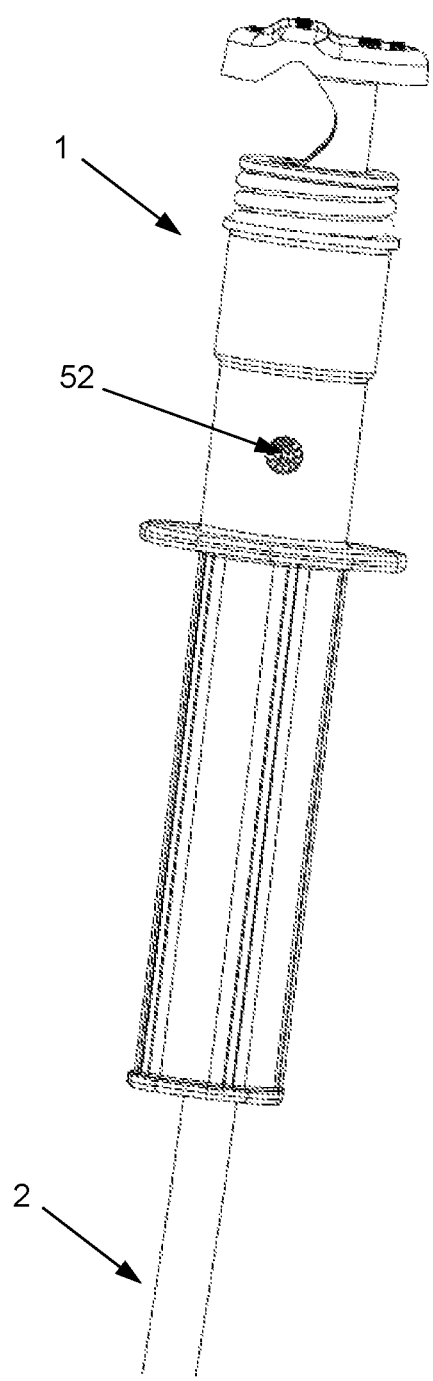
FIG. 1 is a perspective view of an exemplary clamping device of the present invention, arranged at an extremity of a flexible conductor.
Figure 2:
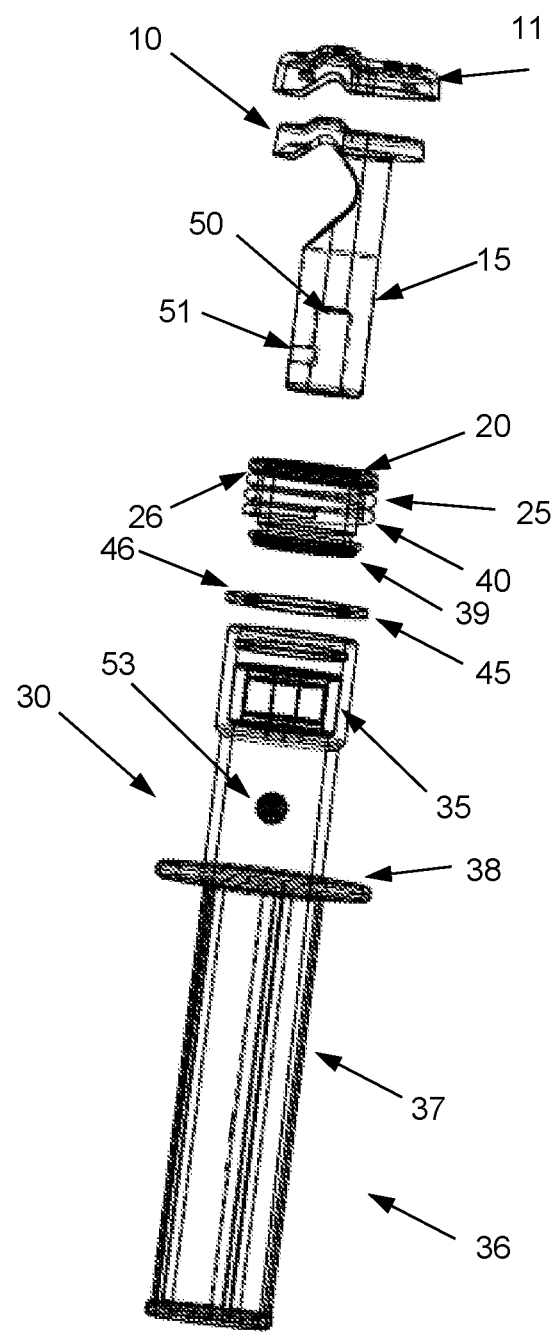
FIG. 2 is an exploded side view of the clamping device of FIG. 1.

FIG. 1 is a perspective view of an example of clamping device 1 arranged at an extremity of a flexible conductor 2. FIG. 2 is an exploded side view of the clamping device of FIG. 1. This clamping device is particularly intended for clamping electrical conductors such as power cables.

The clamping device 1 includes a first jaw 10 having a general shape of a hook and a second jaw 20 having a general shape of a ring. In the following, the first jaw 10 is also referred to as a fixed jaw and the second jaw 20 is also referred to as a mobile jaw. The terms "fixed" and "mobile" refer more particularly to the installation of the clamping device, in which the first jaw is hooked on an electrical conductor, then the second jaw is moved toward the first jaw to effect clamping, and these terms are used only for convenience, without restricting the relative arrangement of the jaws on the clamping device or their relative movement in use or the manipulation of the clamping device, notably to position the jaws and/or bring the jaws closer to each other or farther from each other, as explained in the present description. In particular, clamping could also be effected by positioning the second jaw on a cable, then bringing the first jaw toward the second jaw, or by bringing both jaws simultaneously toward each other to clamp the cable.

The hook-shaped first jaw 10 is supported by a first support member 15 which is in a general shape of a rod. Here, the first jaw 10 is integral and formed in one piece with the rod 15, the first jaw being arranged in the continuity of the rod at one end of the rod along a main axis of the clamping device, and an attachment or connector for another support or connecting element, here, the conductor cable 2, being provided at the other end of the rod. A cap 11 in insulating material is arranged on the extremity of the hook forming an extremity of the clamping device, for example by overmolding, gluing, and/or clipping on.

The ring-shaped second jaw 20 is supported by a second support member 25 which is in a general shape of a sleeve. Here, the second jaw 20 is integral and formed in one piece with the sleeve 25, the second jaw being arranged at one end of the sleeve along a main axis of the clamping device, a flange surface 26 transverse to a main axis of the device being formed at a juncture between the sleeve 25 and the second jaw 20.

Advantageously, the projection of the clamping surface of the first jaw is partially or totally inscribed within the free disc-shaped space within the annular clamping surface of the second jaw, when seen in a direction of the main axis of the clamping device. Advantageously, the projections of the clamping surfaces of the first and second jaws are adjacent or substantially adjacent when seen in the direction of the main axis, especially in a location of a cable on which the first jaw is hooked. Advantageously, the projection of the clamping surface of the first jaw, or of the surface of the first jaw inscribed within forming the hook shape, covers a substantial portion or even substantially all the free disc-shaped space within the annular clamping surface of the second jaw. In a variant, the first and second jaws include clamping surfaces directly facing each other in a direction of the main axis of the clamping device.

Varying shapes to the hook and/or the ring could be provided for the first and second jaw, as long as the first and second jaw have clamping surfaces making it possible to clamp an object in-between the jaws. Generally, the first jaw includes a clamping surface having a main transverse plane and facing a main transverse plane of a clamping surface of the second jaw, the clamping surfaces of the first and second jaws being planar, rounded, ridged, or crenellated, for example, and being advantageously arranged within the outlines of a hook and of a ring, respectively, as described above. For example, the first jaw can have a single planar or rounded clamping surface and the second jaw can have a plurality of clamping surfaces distributed around the main axis.

An actuation member 30 includes a nut 35 having an internal thread cooperating with an external thread provided on at least a portion of the rod. The nut 35 is integral with a handle 36 which is made here of transparent or translucent plastic material overmolded on the nut. The handle 36 includes a generally cylindrical portion 37 around the main axis and a radial flange 38 forming a finger guard or an actuation surface to assist in manipulating the clamping device and/or in operating the handle rotationally.

The sleeve-shaped second support member 25 of the second jaw 20 is mounted on the end of the handle 35 that is closer to the jaws in the direction of the main axis. The second support member 25 remains free in rotation relative to the actuation member 30. For example, as shown here, the end of the second support member 25 opposite the second jaw has an external peripheral groove and the end of the handle 36 has an internal peripheral flange, the second support being partially inserted in the end of the handle and maintained by a circlip 39 penetrating partially in the external groove of the second support member and retained within the handle by the internal peripheral flange, so that the second support is limited in movement relative to the handle in a translation direction along the main axis, while being free relative to the handle in a rotational direction.

A compression member in the form of a cylindrical compression spring 40 is arranged between the second jaw 20 and the actuation member 30, more particularly between the second support 25 and a ring 45 disposed on the end of the handle facing the second jaw, even more particularly between the radial flange 26 on the second support and a facing radial flange 46 on the ring 45. The spring 40 is arranged so that the force of the spring 40 tends to push the second jaw toward the first jaw.

Advantageously, the second jaw and the compression member, optionally also the handle of the actuation member, optionally additionally the first support member and the nut, have substantially rotational symmetry around the main axis. Advantageously, the first support member and the nut, optionally also the second support member and the compression member, optionally additionally the second jaw, have substantially rotational symmetry around the main axis. In this manner, a compact arrangement can be obtained, which is advantageously inscribed within an elongated cylinder shape, especially at least the jaws, the actuation element, the second jaw and the actuation element, or both the jaws and the actuation element, as shown in the Figures.

By rotating the nut, the second jaw can be moved translationally toward or away from the first jaw while not moving rotationally relative to the first jaw. When the first and second jaw are in a clamping position around an object, the handle can be rotated to adjust the compression of the compression member without substantial movement of the jaws relative to each other, rotationally and/or translationally.

The first jaw is rotationally movable relative to the handle and/or to the second jaw, for example, to position the hook of the first jaw on a power cable and/or to move the handle to bring the second jaw toward the first jaw after hooking the first jaw on a power cable.

Advantageously, the first and second jaw include an electrically conductive clamping surface. Advantageously, the first jaw is in a conductive material, and/or the second jaw is in a conductive material. Alternatively, the first jaw can include a conductive material core connected to a conductive material core of the first support, or the entire first jaw and first support are in a conductive material. Further, alternatively or additionally, the first jaw includes a conductive material core connected to a conductive material core of the first support. In one aspect, the first jaw is electrically connected to a conductor attached, assembled and/or integral with the first support member, such as a rod or a cable, for example. When the first support member is in a conductive material, the handle is advantageously in an insulating material surrounding the first support member, or a substantially portion of the first support member.

In the embodiment shown on the Figures, the conductor cable 2 is held in the device by inserting an extremity of the cable inside the hollow handle until the extremity of the cable penetrates in a cavity 50 in the rod 15 that opens on a bottom face of the rod 15. The cavity 50 can be cylindrical with an orientation along the main axis, or another shape that has a symmetry of revolution along the main axis, and/or a shape with ridges and hollows, for example, to help retain the extremity of the cable within the cavity 50. The cavity 50 can be a blind cavity or a cavity that also opens upwardly at the level of the hook shape, for example. A transverse passage 51 is provided for lodging a transverse blocking member 52 that passes in and/or through the passage 51 and can be moved to protrude within the cavity 50, then blocked in position, for example, to press the extremity of the cable against the wall of the orifice 50 at the location opposite the transverse passage 51, so as to prevent the extremity of the cable from sliding out of the orifice 50. A corresponding passage 53 is provided in the handle 30, for example a bore that faces the transverse passage 51 in at least one position of the handle, so that the transverse blocking element 52 can be accessed to block or release the extremity of the conductor cable 2. More particularly, the passage 51 is advantageously a threaded hole, the blocking member 52 being a screw screwed in the threaded hole, the length of the screw 52 being adapted so that the screw does not protrude within the passage 53 in the handle 30 when the screw 52 is screwed in, holding the extremity of the conductor cable 2 inside the cavity 50, thus allowing the handle 30 to rotate relative to the rod 15.

Figure 3:
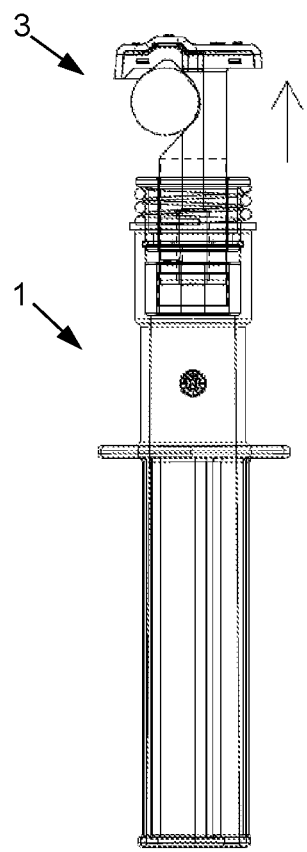
FIGS. 3, 4 and 5 are side views showing the operation of the clamping device of FIG. 1 in order to clamp a cable, including successively, moving the jaws of the clamping device closer to each other to clamp a cable (FIG. 3), clamping the cable (FIG. 4), and compressing a compression member of the clamping device to improve the clamping effect on the cable (FIG. 5).
Figure 4:
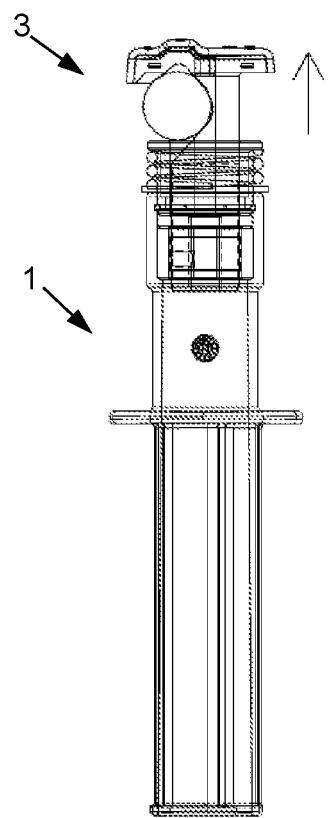
Figure 5:
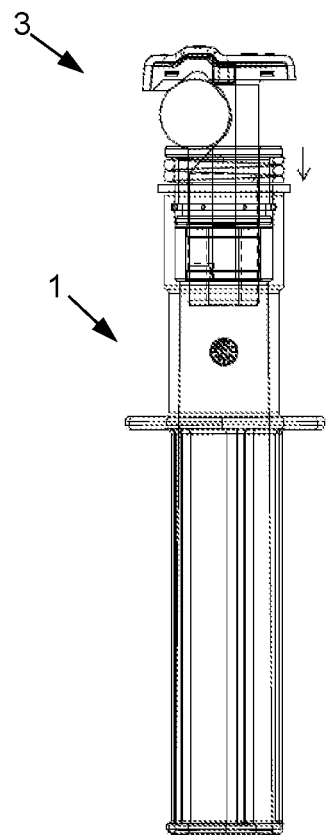

FIGS. 3, 4 and 5 are side views showing the operation of the clamping device of FIG. 1 in order to clamp a cable 3, including successively, moving jaws of the clamping device closer to each other to clamp a cable (FIG. 3), clamping the cable (FIG. 4), and compressing the compression member of the clamping device to improve the clamping effect on the cable (FIG. 5).

In a first stage shown on FIG. 3, the first jaw is hooked on the cable 3 (symbolized by a circle), and the handle is then rotated in a first rotational direction to move the jaws of the clamping device closer to each other. A hook shape is adapted at least to rest an object against a clamping surface of the first jaw in a direction of the main axis of the clamping, and optionally to also rest the object in at least one transverse direction, or in both transverse directions, the hook shape including for example a recess in a direction of the main axis at the top of the hook, so as to position a cable transversally in the hook as shown here. The surface of the second jaw could also include a recess (not shown), in a location and orientation corresponding to the recess in the first jaw, or even a plurality of recesses having radial orientations distributed around the second jaw, for example.

To bring the second jaw closer to the first jaw, the actuation member is rotated. The threading of the nut integral with the handle cooperates with the threading of the rod supporting the first jaw. This way, the actuating member is displaced in a translation direction along the main axis (upwards in the position of the clamping device shown in the Figures). The spring remains substantially uncompressed during this stage, and the second jaw is in turn displaced in a translation direction along the main axis toward the second jaw, until the clamping surface of the second jaw contacts the cable.

In a second stage shown on FIG. 4, the clamping surface of the second jaw has reached contact with the underside of the cable. Then, when the handle is rotated further in the same first rotational direction, the handle continues to move up, but the second jaw is blocked by the cable. As a result, the bearing surfaces 46 and 26 on the ring 45 and on the second support 25, respectively, become closer to each other, which compresses the spring 40, as illustrated in FIG. 5.

At this stage, the conductor is clamped between the first and second jaws, with a clamping force controlled by the compression of the spring. As a result, in the case of irregularities of shapes of the conductor, and/or in the case of deformations of the conductor that may cause a relative movement of the clamping device with respect to the conductor, for example, or another relative movement or differential force exerted on the conductor or on the jaws, the clamping force remains controlled by the compression of the spring. In this manner, variations in the clamping pressure can be substantially compensated by the spring, which acts as compensation member between the second jaw and the actuation element, and thus, between the first and second jaws.

To remove the clamping device from the power cable, the handle is simply rotated in the opposite rotational direction, which first releases the compression of the spring, then brings the second jaw farther from the first jaw, so as to allow removing the hook-shaped jaw from the cable.

The cross-sectional views of FIGS. 6 and 7 also illustrate more particularly the operation of the clamping device, especially before (FIG. 6) and during (FIG. 7) compression of the spring to improve the clamping effect on the cable.

For further illustration, FIGS. 8 and 9 are partial cross-sectional views of the clamping device 1, showing the jaws holding a cable without compression of the compression member (FIG. 8) and with compression of the compression member (FIG. 9).

FIGS. 10 and 11 are partial cross-sectional views of a variant 1' of the clamping device of FIGS. 8 and 9, in a position positioned around a cable 3' of small diameter (FIG. 10) and in a position clamping the cable 3' (FIG. 11). In this variant, the first jaw has a hook shaped with a top radial surface forming a pronounced groove having a general shape of an inverted V, so as to be able to lodge and hold the small diameter cable 3' within the groove.

In the position shown in FIG. 11, the jaws have been moved toward each other until they contact each other, a radial flange of the first jaw being in contact with the facing portion of the annular second jaw, so that the cable 3' is being clamped in-between the jaws, or even simply held in-between the jaws, with a portion of the cable 3' resting in the V-shaped groove of the first jaw and adjacent portions of the cable 3' resting against radially opposite portions of the annular second jaw, with or without clamping force.

Thus, the clamping device 1 or 1' is adapted for holding or clamping of objects of various shapes and sizes, including cables of different diameters, or cables or other objects having varying dimensions and/or shapes along their length, with compensation of the clamping pressure being provided by the compensation member.

Figure 12:
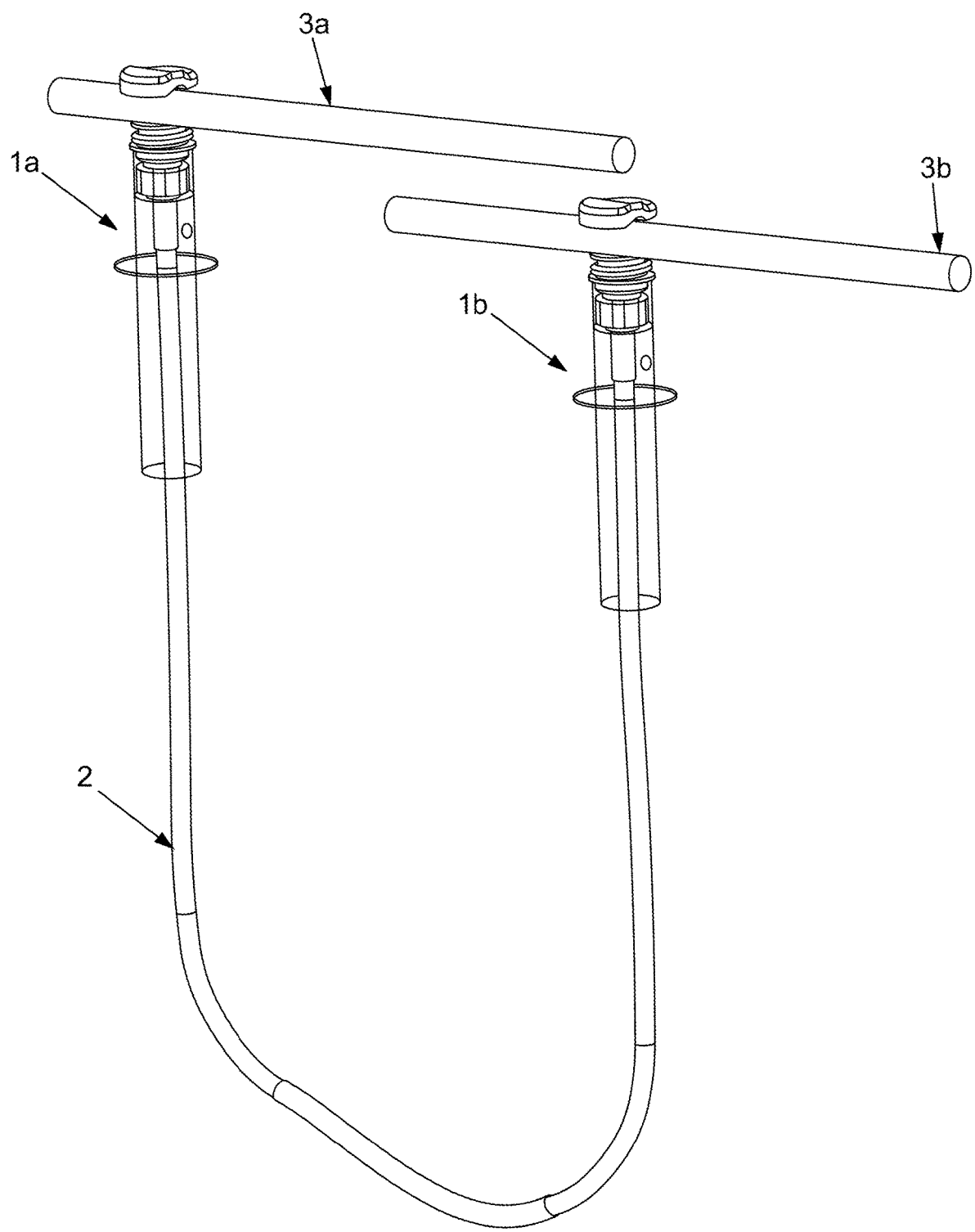
FIG. 12 is a perspective view of a bypass device comprising two clamping devices as shown in FIGS. 1 and 2 connected by a bypass cable, the bypass device being arranged between two conductor sections of cables.

FIG. 12 is a perspective view of a bypass device comprising two clamping devices 1a and 1b as shown in FIGS. 1 and 2 connected by a bypass conductor cable 2a. The bypass device is arranged between two sections of electrical conductors 3a and 3b, which can be portions of a same power cable, or portions of different power cables, for example.

More generally, the clamping device or each clamping device can be clamped on an electrical conductor without tools, simply by rotating the handle. Alternatively, a tool may be needed or useful to actuate the handle having an actuating external surface adapted to be rotated using a tool, such as crenellations or a contour forming a polygonal projection, or to actuate the nut directly, for example, in an embodiment (not shown) where an actuating external surface of the nut adapted to be rotated by hand or using a tool is directly accessible. In at least some embodiments, the jaws become clamped on the electrical conductor by the translation movement, or translation component of movement, of the second jaw toward the first jaw, for example, the translational component of movement caused by the helical movement of the nut on the threading of the rod supporting the first jaw when the handle is rotated, the nut being linked in rotation with the handle.

The exemplary clamping device shown in the Figures has a main longitudinal axis, and most parts have a substantial rotational symmetry around the main longitudinal axis. The clamping device is described in reference to the drawings showing the main longitudinal axis vertical or slightly inclined from the vertical, with the first and second jaws at the upper end of the device, but it is self-evident that the clamping device can be placed and used in any position, and that the words "top" and "bottom", "upper" and "lower", "up" and "down", and similar, are non-limitative and refer only to the particular position illustrated in the Figures, for convenience and language simplification.

The first support could be in the shape of an elongated rod or a pole, or connected or assembled with an elongated rod or pole, for example, in an hot stick embodiment. In the embodiment shown here, the first support is in the shape of a cylindrical rod having the first jaw secured or integrally made at one end, and having a socket at an opposite end adapted for securing the extremity of a cable, as shown here in FIG. 1.

Advantageously, at least in some embodiments, the clamping device provides a secure clamping effect controlled by the force applied by the compression member, which compensates irregularities in the surface geometry of the object being clamped and/or irregularities in the position and/or shape of the object with time, for example, without significant modification of the clamping pressure or effect throughout these geometrical discrepancies or changes, so as to reduce the risk of an accident, such as fire, electrocution, etc.

The shape and/or size of the jaws, and notably the shape and dimension of the passage for a cable provided by the hook shape of the first jaw, and/or the diameter and radial width of the ring shape of the second jaw, can be adapted to the shape and dimension of the cable to which the clamping device is intended. Alternatively, supplemental elements can be added to the jaws, for example, by clipping or otherwise, to adjust the size of the jaws to different types, shapes and sizes of conductors.

Various modifications of the clamping device described here are available to the person of ordinary skill in the art, and remain within the scope, intent and spirit of the present invention.

The invention claimed is:

1. A clamping device comprising:
a first jaw mounted on a first support member,
a second jaw mounted on a second support member, the second support member being movable relative to the first support member to bring the first and second jaws toward each other in a clamping position,
an actuation member adapted to move the second support member relative to the first support, and
a compression member between the actuation member and the second support member, the compression member being adapted to compensate a clamping force between the first jaw and the second jaw in the clamping position of the clamping device,
wherein the second jaw comprises a ring-shaped portion and the second support member comprises a support ring portion and/or a support sleeve portion.

2. The clamping device as claimed in claim 1, wherein the support ring portion and/or the support sleeve portion is/are integral with the ring portion of the second jaw.

3. The clamping device as claimed in claim 1, wherein the compression member is comprised within a cylindrical shape.

4. The clamping device as claimed in claim 1, wherein the first jaw comprises a hook-shaped portion and the first support member comprises a rod-shaped portion.

5. The clamping device as claimed in claim 4, wherein the hook-shaped portion of the first jaw is integral with the rod portion.

6. The clamping device as claimed in claim 1, wherein the actuation member comprises a nut.

7. The clamping device as claimed in claim 6, wherein the actuation member comprises a handle, the nut and the handle being linked in rotation.

8. The clamping device as claimed in claim 1, wherein the compression member is a resilient member.

9. The clamping device as claimed in claim 8, wherein the resilient member comprises a spring.

10. The clamping device as claimed in claim 1, wherein each of the second support member, the actuation member, and the compression member at least partially surrounds a rod-shaped portion of the first support member in at least one position of the first and second jaws.

11. The clamping device as claimed in claim 10, wherein the rod-shaped portion of the first support member and the actuation member cooperate by threading, so that a rotation of the actuation member in one rotational direction brings the second jaw closer to the first jaw and a rotation of the actuation member in an opposite rotational direction brings the second jaw farther from the first jaw.

12. The clamping device as claimed in claim 1, wherein
the first jaw comprises a hook-shaped portion and the first support member comprises a rod-shaped portion,
the ring-shaped portion of the second jaw and the support ring-shaped portion and/or the support sleeve portion surround at least partially the rod-shaped portion of the first support member in at least one position of the first and second jaws, and are mobile in a translation direction along a main axis of the rod-shaped portion of the first support member to bring the ring-shaped portion of the second jaw closer to or farther from the hook-shaped portion of the first jaw, and
the compression member comprises a compression spring surrounding the rod-shaped portion of the first support member.

13. The clamping device as claimed in claim 12, wherein the rod-shaped portion of the first support member and the actuation member cooperate by threading, so that a rotation of the actuation member in one rotational direction brings the ring-shaped portion of the second jaw closer to the hook-shaped portion of the first jaw and a rotation of the actuation member in an opposite rotational direction brings the ring-shaped portion of the second jaw farther from the hook-shaped portion of the first jaw.

14. The clamping device as claimed in claim 13, wherein
the rod-shaped portion of the first support member has an external thread and the actuation member comprises a nut having an internal thread cooperating with the external thread of the rod-shaped portion of the first support member, and
the actuation member comprises a handle, the nut and the handle being linked in rotation.

15. The clamping device as claimed in claim 14, wherein the handle surrounds the rod-shaped portion of the first support member in at least one position of the first and second jaws, the nut being integral with the handle.

16. The clamping device as claimed in claim 15, wherein
the second support member comprises a first annular bearing surface and the actuation member comprises a second annular bearing surface facing the first bearing surface along a direction of a main axis of the clamping device, and
the compression spring is placed between the first and second annular bearing surfaces.

17. The clamping device as claimed in claim 16, wherein the handle comprises a substantially cylindrical portion oriented along the main axis of the clamping device and a radial annular flange oriented transversely to the main axis of the clamping device.

18. The clamping device as claimed in claim 6, wherein the first support member comprises a rod-shaped portion, and the nut surrounds the rod and cooperates with the rod-shaped portion by threading.

19. The clamping device as claimed in claim 18, wherein the actuation member comprises a handle, the nut and the handle being linked in rotation.

20. The clamping device as claimed in claim 1, wherein
the first jaw comprises a hook-shaped portion and the first support member comprises a rod-shaped portion, and
the ring-shaped portion of the second jaw and the support ring-shaped portion and/or the support sleeve portion of the second support member surround the rod-shaped portion of the first support member in at least one position of the first and second jaws.

21. The clamping device as claimed in claim 20, wherein the actuation member comprises a nut.

22. The clamping device as claimed in claim 21, wherein the nut surrounds the rod and cooperates with the rod-shaped portion by threading.

23. The clamping device as claimed in claim 21, wherein the actuation member comprises a handle, the nut and the handle being linked in rotation.

24. The clamping device as claimed in claim 22, wherein the actuation member comprises a handle, the nut and the handle being linked in rotation.

25. A clamping device comprising:
a first jaw mounted on a first support member,
a second jaw mounted on a second support member, the second support member being movable relative to the first support member to bring the first and second jaws toward each other in a clamping position,
an actuation member adapted to move the second support member relative to the first support, and a compression member between the actuation member and the second support member, the compression member being adapted to compensate a clamping force between the first jaw and the second jaw in a clamping position of the clamping device, wherein the actuation member comprises a nut.

26. The clamping device as claimed in claim 25, wherein the actuation member comprises a handle, the nut and the handle being linked in rotation.

27. The clamping device as claimed in claim 25, wherein the nut surrounds the rod and cooperates with the rod-shaped portion by threading.

28. The clamping device as claimed in claim 27, wherein the actuation member comprises a handle, the nut and the handle being linked in rotation.

29. A clamping device comprising:

a first jaw mounted on a first support member, a second jaw mounted on a second support member, the second support member being movable relative to the first support member to bring the first and second jaws toward each other in a clamping position, an actuation member adapted to move the second support member relative to the first support, and a compression member between the actuation member and the second support member, the compression member being adapted to compensate a clamping force between the first jaw and the second jaw in a clamping position of the clamping device, wherein each of the second support member, the actuation member, and the compression member at least partially surrounds a rod-shaped portion of the first support member in at least one position of the first and second jaws.

30. The clamping device as claimed in claim 29, wherein the rod-shaped portion of the first support member and the actuation member cooperate by threading, so that a rotation of the actuation member in one rotational direction brings the second jaw closer to the first jaw and a rotation of the actuation member in an opposite rotational direction brings the second jaw farther from the first jaw.

* * * * *